United States Patent [19]

Ohnaga et al.

[11] Patent Number: 5,200,492
[45] Date of Patent: Apr. 6, 1993

[54] POLYMER BLENDS

[75] Inventors: Takashi Ohnaga; Toshiaki Sato; Shiro Nagata, all of Kurashiki; Mitsuo Ohtani, Niigata; Koji Arakawa, Shibata; Teruo Hasegawa, Nakajo, all of Japan

[73] Assignee: Kuraray Co., Ltd., Kurashiki, Japan

[21] Appl. No.: 782,055

[22] Filed: Oct. 24, 1991

[30] Foreign Application Priority Data

Oct. 29, 1990 [JP] Japan .................. 2-292533

[51] Int. Cl.$^5$ .............. C08L 69/00; C08L 33/16; G02B 1/04
[52] U.S. Cl. ..................... 428/64; 428/65; 428/412; 428/913; 525/148; 526/292.5
[58] Field of Search ............ 525/148; 526/292.5; 428/64, 65, 412, 913

[56] References Cited

U.S. PATENT DOCUMENTS

| 3,817,913 | 6/1974 | Gaenzler | 526/292.5 |
| 3,932,321 | 1/1976 | Maki | 525/148 |
| 4,906,696 | 3/1990 | Fischer | 525/148 |

FOREIGN PATENT DOCUMENTS 004552  1/1977  Japan ................... 525/67

Primary Examiner—David J. Buttner
Attorney, Agent, or Firm—Oblon, Spivak, McClelland, Maier & Neustadt

[57] ABSTRACT

Polymer blends comprising a copolymer (A) which comprises 50 to 98% by weight of units from methyl methacrylate, 2 to 50% by weight of units from an acrylate and/or methacrylate having a halogen-substituted aromatic ring, and 0 to 25% by weight of units from other copolymerizable $\alpha,\beta$-substituted monomer, and an aromatic polycarbonate (B).

8 Claims, No Drawings

POLYMER BLENDS

BACKGROUND OF THE INVENTION

1. Field of the Invention

The present invention relates to polymer blends, and more particularly to polymer blends comprising methyl methacrylate copolymer and aromatic polycarbonate.

The polymer blends obtained by the present invention have excellent transparency and used beneficially as transparent materials having characteristics of both polymethyl methacrylate and aromatic polycarbonate and as films, plates and like shaped articles, in particular as optical shaped articles such as lenses and optical disk substrates.

2. Description of the prior Art

Polymethyl methacrylate has excellent characteristics in transparency, weather resistance and surface hardness. This resin however has the problems of insufficient thermal resistance and mechanical properties when used for specific purposes, high water absorption and the like and improvement of these problems has been desired. On the other hand, aromatic polycarbonates, in particular one obtained from Bisphenol-A and phosgene (hereinafter referred to as "Bisphenol-A polycarbonate") have excellent mechanical properties, thermal resistance and transparency, but have the drawbacks of large residual stress and birefringence caused by poor melt flow during their processing. Blending the two resins has been attempted for the purpose of obtaining a transparent resin having both of their excellent characteristics. For example, a transparent, completely compatible blend is obtained by mixing polymethyl methacrylate and Bisphenol-A polycarbonate in a common solvent of tetrahydrofuran and then casting the solution into film. However the obtained film separates into two phases since the cloud point of the blend of the two resins is about 180° C. at most. It is known that melt blending of polymethyl methacrylate and an aromatic polycarbonate therefore cannot provide a completely compatible blend but gives a blend having an opalescent luster, thus being not transparent (see J. Polym. Sci., Polym. Phys. Ed., 25, 1459 (1987)).

Attempts have also been made to prepare blends of aromatic polycarbonate with methyl methacrylate copolymers having introduced various comonomer units for the purpose of improving compatibility at high temperatures. For example, U.S. Pat. No. 4,749,749 discloses that a transparent blend is obtained by melt blending Bisphenol-A polycarbonate with a copolymer of methyl methacrylate and a methacrylamide, e.g. N-cyclohexylmethacrylamide. U.S. Pat. No. 4,950,716 discloses a transparent or only slightly cloudy blend obtained by melt blending Bisphenol-A polycarbonate with a copolymer of methyl methacrylate and a maleimide, e.g. N-cyclohexylmaleimide. However, since the methyl methacrylate copolymers described in U.S. Pat. Nos. 4,749,749 and 4,950,716 both contain nitrogen atoms, the above blends have, as described in Example of the latter, the drawbacks of ready discoloration upon melt molding and low cloud point which is unsatisfactory for melt blending at higher temperatures.

U.S. Pat. No. 4,906,696 proposes, to solve the above problems, to use as a comonomer for methyl methacrylate copolymer methacrylate and/or acrylate comprising cyclic hydrocarbon in the ester group, and if necessary also use styrene unit and/or α-methylstyrene unit. According to this U.S. Pat. No. 4,906,696, extrusion of a mixture of Bisphenol-A polycarbonate and a methyl methacrylate copolymer containing units from these comonomer gives a transparent blend, the cloud point of which is higher than that of a blend of polymethyl methacrylate and Bisphenol-A polycarbonate. The patent describes that for example a blend of Bisphenol-A polycarbonate and a copolymer of methyl methacrylate and phenyl methacrylate has a cloud point of 250° C. or above.

Although there has been thus reported improvement of compatibility of a polymethyl methacrylate with an aromatic polycarbonate by modifying the polymethyl methacrylate by copolymerization, blends of known methyl methacrylate copolymers and aromatic polycarbonate cannot be said to have cloud points of sufficiently high level. That is, since these blends have, by the presence of polycarbonate being blended therein, higher melt viscosity than polymethyl methacrylate and their suitable processing temperatures hence shift to higher side, no known blends have sufficiently higher cloud point than their processing temperatures. The blend so far known to have the highest cloud point is the above-mentioned one of the aromatic polycarbonate and a methyl methacrylate copolymer containing units from phenyl methacrylate. Even this blend has a cloud point of about 250° C. at most, which is insufficient for an appropriate, optional selection of processing conditions.

In blends as herein discussed, their physical property characteristics are, as well as the compatibility between the two constituting resins, of very great significance. The blend of Example 48 of U.S. Pat. No. 4,906,696, i.e. that using a copolymer prepared from methyl methacrylate and phenyl methacrylate, has, its glass transition temperature being as low as 117° C., insufficient thermal resistance; while that of Example 63 using a copolymer prepared from methyl methacrylate, phenyl methacrylate and α-methyl styrene is, although its glass transition temperature is increased, of low cloud point. To summarize, while improvement in compatibility, particularly that at high temperatures, by the introduction of other comonomer units into polymethyl methacrylate has been reported, the improvement so far has been accompanied with the problems of discoloration upon blending, insufficiently high glass temperature and too large water absorption of the obtained blend, and the like. There has thus not been obtained a blend of polymethyl methacrylate and aromatic polycarbonate being excellent in all of transparency, thermal resistance and suppressed water absorption.

SUMMARY OF THE INVENTION

Accordingly, an object of the present invention is to provide a polymer blend comprising a methyl methacrylate copolymer and an aromatic polycarbonate, having a cloud point which is sufficiently higher than the processing temperature suited therefor, and being excellent in all of transparency, thermal resistance and reduced water absorption.

As a result of an intensive study to find out a suitable copolymerization component of methyl methacrylate copolymer, the present inventors have found that the above object can be achieved by providing a blend of an aromatic polycarbonate and a copolymer prepared from methyl methacrylate and an acrylate and/or methacrylate having a halogen-substituted aromatic group.

Thus, the present invention provides a polymer blend comprising a copolymer (A) which comprises i) 50 to 98% by weight of units from methyl methacrylate and (ii) 2 to 50% by weight of units from a monomer represented by the general formula (I), and an aromatic polycarbonate (B)

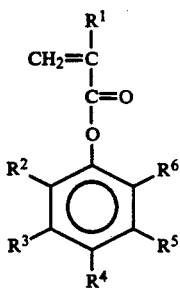

(I)

wherein R' represents a hydrogen atom or a methyl group, and $R^2$, $R^3$, $R^4$, $R^5$ and $R^6$ each represents a halogen atom or at east one of them represents a halogen atom with the rest representing a hydrogen atom, a lower alkyl group or a lower alkoxyl group.

DETAILED DESCRIPTION OF THE PREFERRED EMBODIMENTS

The copolymer (A) used in the present invention comprises as essential components units from methyl methacrylate and units from a monomer represented by the general formula (I)

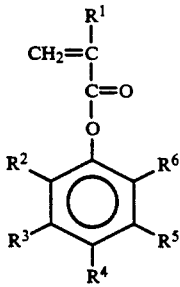

(I)

wherein $R^1$ represents a hydrogen atom or a methyl group, and $R^2$, $R^3$, $R^4$, $R^5$ and $R^6$ each represents a halogen atom or at least one of them represents a halogen atom with the rest representing a hydrogen atom, a lower alkyl group or a lower alkoxyl group.

Examples of the halogen atom represented by $R^2$ through $R^6$ in the monomer represented by the general formula (I) are chlorine, bromine and iodine; those of the lower alkyl group are methyl and ethyl; and those of the lower alkoxyl group are methoxy and ethoxy. Examples of the monomer represented by the general formula (I) are chlorophenyl methacrylates, dichlorophenyl methacrylates, trichlorophenyl methacrylates, tetrachlorophenyl methacrylates, pentachlorophenyl methacrylate, bromophenyl methacrylates, dibromophenyl methacrylates, tribromophenyl methacrylates, pentabromophenyl methacrylate, chlorophenyl acrylates, dichlorophenyl acrylates, trichlorophenyl acrylates, tetrachlorophenyl acrylates, pentachlorophenyl acrylate, bromophenyl acrylates, dibromophenyl acrylates, tribromophenyl acrylates and pentabromophenyl acrylate; among which, in particular, 2,4,6-tribromophenyl methacrylate is preferably used.

In the copolymer (A), the content of the units from methyl methacrylate is 50 to 98% by weight, preferably 50 to 95% by weight, more preferably 50 to 90% by weight. It is necessary that the content be at least 50% by weight to maintain the good weather resistance and transparency inherent to polymethyl methacrylate.

The content of the monomer represented by the general formula (I) in the copolymer (A) is 2 to 50% by weight, preferably 5 to 50% by weight and more preferably 10 to 50% by weight. With the content being less than 2% by weight the copolymer (A) is not sufficiently compatible with aromatic polycarbonate (B), while with a content exceeding 50% by weight the copolymer (A) has inferior strength characteristics.

It is possible that the copolymer used in the present invention contain, as occasions demand and within the limit not to impair the effect of the present invention, not more than 25% by weight of units from $\alpha,\beta$-unsaturated monomers other than methyl methacrylate and the monomer represented by the general formula (I). Examples of the other monomers are aromatic vinyl monomers such as styrene, α-methylstyrene, vinyltoluene, 2,4-dimethylstyrene and styrenes with halogen-substituted ring; acrylates having 1 to 18 carbon atoms, such as methyl acrylate, ethyl acrylate, propyl acrylate, isopropyl acrylate, butyl acrylates, 2-ethylhexyl acrylate, lauryl acrylate, cyclohexyl acrylate and phenyl acrylate; methacrylates having 2 to 18 carbon atoms, such as ethyl methacrylate, propyl methacrylate, isopropyl methacrylate, butyl methacrylates, 2-ethylhexyl methacrylate, lauryl methacrylate, cyclohexyl methacrylate and phenyl methacrylate; acylic acid, methacrylic acid, acrylamide, methacrylamide, acrylonitrile, methacrylonitrile, maleic anhydride, maleimide, monomethyl maleate, monoethyl maleate, monoisopropyl maleate, dimethyl maleate and diethyl maleate. Preferred among the above examples are aromatic vinyl monomers of styrene and α-substituted styrene, acrylates having 1 to 12 carbon atoms and methacrylate having 2 to 12 carbon atoms.

The copolymer (A) used in the present invention may have any average molecular weight, but preferably has a number average molecular weight of 10,000 to 5,000,000, more preferably 50,000 to 500,000 in view of mechanical property characteristics and melt processability.

The copolymer (A) is produced by known processes for polymerizing $\alpha,\beta$-unsaturated compounds, in particular by free radical polymerization, such as bulk, solution, suspension or emulsion polymerization.

The free radical polymerization is carried out using an initiator, e.g. azo compounds such as azobisisobutyronitrile and azobis(γ-dimethylvaleronitrile) and peroxides such as benzoyl peroxide, cumyl peroxide, oxyneodecanoate, diisopropylperoxydicarbonate, t-butylcumyl peroxide, cumene hydroperoxide, t-butyl hydroperoxide, cyclohexanone peroxide, methyl ethyl ketone peroxide, dicumyl peroxide, and lauroyl peroxide.

Generally, the initiator is used in an amount of 0.05 to 0.5% by weight based on the weight of the monomers and at a temperature of 50° to 140° C. for 2 to 20 hours, to give the copolymer (A).

To control the molecular weight of the resulting copolymer (A), it is convenient to use a chain transfer agent. Examples of suitable chain transfer agents are methylmercaptan, ethylmercaptan, isopropylmercaptan, n-propylmercaptan, t-butylmercaptan, n-hexylmercaptan, n-octylmercaptan, n-dodecylmercaptan, ethylthioglycolate, mercaptoethanol, thio-β-naphthol and thiophenol, and they are generally used in an amount of 0.005 to 0.5% by weight based on the weight of total monomers.

Examples of the aromatic polycarbonate (B) used in the present invention are 4,4-dihydroxydiphenylalkanone-based polycarbonates, among which particularly preferred is Bisphenol-A polycarbonate. The aromatic polycarbonate used has, desirably, a number average molecular weight of 10,000 to 500,000, more preferably 10,000 to 60,000 from the viewpoint of melt processability.

In the polymer blends of the present invention, the copolymer (A) and the aromatic polycarbonate (B) are compatible with each other in any blending ratio, and they are always transparent. However, with a ratio in which one of the two polymers is too small, the blends will not exhibit sufficient characteristics. The ratio by weight between the copolymer (A) and the aromatic polycarbonate (B) therefore is in a range of 1/99 to 99/1, preferably in a range of 2/98 to 98/2, more preferably in a range of 5/95 to 95/5 and most preferably in a range of 10/90 to 90/10.

The copolymer (A) and the aromatic polycarbonate (B) can be blended by any known process, e.g. one which comprises melt blending with a Bravendor type mixer. Also, they can be blended by dissolving them in a common solvent such as tetrahydrofuran and then casting the solution into a film. Upon blending, additives such as antioxidant and ultraviolet absorber may be added, and further other polymers may also be added, within limits not to damage the characteristics of the polymer blend of the present invention.

The blends of the copolymer (A) and the aromatic polycarbonate (B) can be used as, for example, pellets which are then processed by extrusion molding, injection molding or the like into various shaped articles, e.g. films, plates, and optical parts, such as lenses and optical disk substrates.

Other features of the invention will become apparent in the course of the following descriptions of exemplary embodiments which are given for illustration of the invention and are not intended to be limiting thereof. In the Examples that follow, "parts" means "parts by weight" unless otherwise indicated, and the properties were tested according to the following methods.

(1) Number average molecular weight: Measured by GPC (calibrated with polystyrene) with a solvent of tetrahydrofuran at 35° C.

(2) Glass transition temperature (Tg): Measured by DSC (Mettler DSC20) in nitrogen and at a temperature elevation rate of 10° C./min.

(3) Light transmittance: A specimen formed by a heat press to a thickness of 2 mm was tested for total light transmittance with an integrating sphere haze meter.

(4) Water absorption: A specimen was immersed in distilled water at 23° C. and its weight when weight increase by water absorption was no longer observed was checked and the weight increase ratio was calculated.

(5) Melt viscosity: Measured with a flow tester (made by Shimadzu Corporation) at 280° C. and a shear rate of 100 sec$^{-1}$.

(6) Cloud point: A solution of a specimen in THF was extended with a glass rod over a cover glass and the cover glass was vaccuum-dried at 120° C. for at least 24 hours to obtain a transparent film. Pieces from the film pieces were each allowed to stand at a different temperature for at least 15 minutes and the lowest temperature at which a specimen piece became turbid was taken as cloud point.

(7) Composition of copolymer: Determined from $^1$H-NMR spectrum measured with JEOL-GSX270 and with a solvent of CDCl$_3$.

(8) Birefringence: A specimen formed by pressing and having a size of 0.25 mm thickness, 10 mm width and 60 mm length was stretched in a silicone oil bath at 130° C. and at a stretching speed of 10 cm/min to a stretch ratio of 1.2, followed by rapid cooling in ice water, to give an oriented film. The oriented film was tested for birefringence with an automatic birefringence tester (made by Mizojiri Kogaku Kogyosho Co.).

EXAMPLES

Synthesis Example 1

A 100-liter pressure-proof polymerization vessel equipped with jacket was charged with 100 parts of a mixture of monomers of 70% by weight of methyl methacrylate, 20% by weight of 2,4,6-tribromophenyl methacrylate, 10% by weight of cyclohexyl methacrylate, 0.1 part of lauroyl peroxide and 0.2 part of n-octylmercaptan, and 200 parts of an aqueous solution containing 99.75% by weight of ion-exchanged water, 0.05% by weight of potassium polymethacrylate and 0.2% by weight of sodium sulfate. Polymerization was initiated with stirring and under an atmosphere of nitrogen and at a polymerization temperature of 75° C. with hot water being circulated through the jacket. Three hours after the start of the polymerization, steam was introduced into the jacket to elevate the temperature to 120° C. and the temperature was maintained for further 1 hour to complete the polymerization. The copolymer thus obtained had a number average molecular weight of $5.34 \times 10^4$ and a Tg of 117° C.

SYNTHESIS EXAMPLES 2 THROUGH 5

Copolymers (A) having different compositions were synthesized as follows. Into glass tube ampules were weighed methyl methacrylate and 2,4,6-tribromophenyl methacrylate in amounts as shown in Table 1 and further 100 parts of toluene and 0.1 part of 1,1-azobiscyclohexane-1-carbonitrile. Each tube was thoroughly outgassed before polymerization by alternate freezing in liquid nitrogen and thawing under vacuum. The tubes were sealed under vacuum. The ampules were then thrown into an oil bath at 90° C. to polymerize for 2 hours, followed by cooling. The ampules were opened and the contents were purified by reprecipitation from methanolacetone 3 times and dried in vacuo, to give copolymers. Table 1 also shows the compositions and the properties of the thus obtained copolymers.

SYNTHESIS EXAMPLES 6 THROUGH 8

The methacrylates and acrylates shown in Table 2 were used as comonomers in place of TBPM for synthesizing methyl methacrylate copolymers in the sam manner as in Synthesis Examples 2 through 5. Table 2 also shows the compositions and the properties of the obtained copolymers.

SYNTHESIS EXAMPLES 9 THROUGH 14

The methacrylates shown in Table 3 were used as comonomers in place of TBPM for synthesizing methyl methacrylate copolymers in the same manner as in Synthesis Examples 2 through 5. Table 3 also shows the compositions and the properties of the obtained copolymers.

TABLE 1

| Synthesis Example | Amounts of Monomers fed | | Methyl methacrylate copolymer synthesized | | |
|---|---|---|---|---|---|
| | MMA[1] (parts) | TBPM[2] (parts) | TBPM content (wt %) | Mn[3] (×10$^{-4}$) | Tg (°C.) |
| 2 | 92.7 | 7.3 | 10.0 | 42.0 | 127 |
| 3 | 82.7 | 17.3 | 22.5 | 34.1 | 135 |
| 4 | 69.3 | 30.7 | 37.1 | 29.4 | 143 |
| 5 | 58.7 | 41.3 | 47.7 | 21.1 | 153 |

[1]Methyl methacrylate
[2]2,4,6-tribromophenyl methacrylate
[3]Number average molecular weight

TABLE 2

| Synthesis Example | Amounts of Monomers fed | | Methyl methacrylate copolymer synthesized | | |
|---|---|---|---|---|---|
| | MMA[1] (parts) | comonomer (parts) | comonomer centent (wt %) | Mn[5] (×10$^{-4}$) | Tg (°C.) |
| 6 | 80.0 | TBPA[2] 19.7 | | 19.5 | 126 |
| 7 | 80.0 | BPM[3] 20.0 | 26.7 | 17.2 | 123 |
| 8 | 80.0 | DCPM[4] 20.0 | 20.7 | 15.4 | 124 |

[1]Methyl methacrylate
[2]2,4,6-tribromophenyl methacrylate
[3]4-bromophenyl methacrylate
[4]2,6-dichlorophenyl methacrylate
[5]Number average molecular weight

TABLE 3

| Synthesis Example | Amounts of Monomers fed | | Methyl methacrylate copolymer synthesized | | |
|---|---|---|---|---|---|
| | MMA[1] (parts) | comonomer (parts) | comonomer centent (wt %) | Mn[5] (×10$^{-4}$) | Tg (°C.) |
| 9 | 93.3 | PMA[2] 6.7 | 10.0 | 31.2 | 122 |
| 10 | 86.7 | PMA 13.3 | 19.0 | 34.3 | 121 |
| 11 | 80.0 | PMA 20.0 | 28.0 | 42.2 | 121 |
| 12 | 66.7 | PMA 33.3 | 43.3 | 40.4 | 123 |
| 13 | 80.0 | TMPM[3] 20.0 | 19.4 | 22.3 | 128 |
| 14 | 80.0 | TMOPM[4] 20.0 | 30.4 | 21.4 | 119 |

[1]Methyl methacrylate
[2]Phenyl methacrylate
[3]2,4,6-trimethylphenyl methacrylate
[4]3,4,5-trimethylphenyl methacrylate
[5]Number average molecular weight

EXAMPLES 1 THROUGH 5

The copolymer (A) obtained in Synthesis Example 1 and an aromatic polycarbonate (panlite L-1250, made by Teijin Chemicals Ltd.) were blended in various ratios as shown in Table 4 through a plastograph (made by Bravender) at 250° C. for 10 minutes and with stirring at 20 rpm. The blends obtained were pressed at 250° C. to form specimens, which were then tested for various items. Table 4 shows the results of measurement for Tg, light transmittance, water absorbency and melt viscosity of each blend. All the specimens had a colorless transparent appearance. From the fact that the Tg's of the blends of Examples 1 through 5 were each found at only one point between the Tg (117° C.) of the polymer shown in Synthesis Example 1 and that (151° C.) of L-1250 and at the same time vary with the blend composition, it is understood that the blends of Examples 1 through 5 are all completely compatible system. Table 4 also shows the results of measurement of cloud point. All the blends of Examples 1 through 5 had cloud points of 270° C. or above, and they were thus had sufficient compatibility.

TABLE 4

| Example | Methyl methacrylate copolymer (parts) | Polycarbonate (parts) | Tg (°C.) | Light transmittance (%) | Water absorption (%) | Melt viscosity (×10$^{-3}$ dyn · sec/cm$^2$) | Cloud point (°C.) |
|---|---|---|---|---|---|---|---|
| | Copolymer of Synthesis Eample 1 | L-1250[1] | | | | | |
| 1 | 90 | 10 | 122 | — | — | — | >350 |
| 2 | 70 | 30 | 127 | 90 | 0.87 | 6.7 | 320 |
| 3 | 50 | 50 | 132 | 91 | 0.65 | 9.4 | 290 |
| 4 | 30 | 70 | 139 | — | — | 10.5 | 270 |
| 5 | 10 | 90 | 146 | — | — | — | 270 |

[1]Bispenol-A polycarbonate; number average molecular weight: 20,000.

EXAMPLES 6 THROUGH 12

Polymer blends were prepared by kneading, in the same manner as in Example 1, 50 parts each of the copolymers obtained in Synthesis Examples 2 through 8 and 50 parts of an aromatic polycarbonate of L-1250, and the blends obtained were tested for cloud point. The results are shown in Table 5.

TABLE 5

| Example | Methyl methacrylate copolymer (parts) | L-1250 (parts) | Cloud point (°C.) |
|---|---|---|---|
| 6 | Copolymer of Synthesis Example 2: 50 | 50 | 260 |
| 7 | Copolymer of Synthesis Example 3: 50 | 50 | 330 |
| 8 | Copolymer of Synthesis Example 4: 50 | 50 | 310 |
| 9 | Copolymer of Synthesis Example 5: 50 | 50 | 300 |
| 10 | Copolymer of Synthesis Example 6: 50 | 50 | 280 |
| 11 | Copolymer of Synthesis Example 7: 50 | 50 | 290 |
| 12 | Copolymer of Synthesis Example 8: 50 | 50 | 280 |

COMPARATIVE EXAMPLES 1 THROUGH 6

Polymer blends were prepared by kneading, in the same manner as in Example 1, 50 parts each of the copolymers obtained in Synthesis Examples 9 through 14 and 50 parts of an aromatic polycarbonate of L-1250, and the blends obtained were tested for cloud point. The results are shown in Table 6.

TABLE 6

| Comparative Example | Methyl methacrylate copolymer (parts) | L-1250 (parts) | Cloud point (°C.) |
| --- | --- | --- | --- |
| 1 | Copolymer of Synthesis Example 9: 50 | 50 | 240 |
| 2 | Copolymer of Synthesis Example 10: 50 | 50 | 270 |
| 3 | Copolymer of Synthesis Example 11: 50 | 50 | 280 |
| 4 | Copolymer of Synthesis Example 12: 50 | 50 | 300 |
| 5 | Copolymer of Synthesis Example 13: 50 | 50 | 275 |
| 6 | Copolymer of Synthesis Example 14: 50 | 50 | 280 |

The above results show that, in blends with polycarbonate, the methyl methacrylate copolymers used in the present invention have clearly better compatibility than other known methyl methacrylate copolymers, e.g. one comprising comonomer units from phenyl methacrylate. Among the methyl methacrylate copolymers used in the present invention, one comprising comonomer units from 2,4,6-tribromophenyl methacrylate has the highest cloud point as compared with those having copolymerized about 20% by weight of other comonomers. It is understood that 2,4,6-tribromophenyl methacrylate is thus one of the most effective comonomers for increasing the compatibility with polycarbonate.

COMPARATIVE EXAMPLES 7 THROUGH 9

Specimens were prepared by press forming, in the same manner as in Example 1, the copolymer of Synthesis Example 1, L-1250 and a polymethyl methacrylate (parapet H1000B; made by Kuraray Co.). The specimens obtained were tested for Tg, light transmittance, water absorption and melt viscosity and the results obtained are shown in Table 7.

The Table, when compared with Table 4, shows that the polymer blends of the present invention have better balanced characteristics of thermal resistance, water absorption and melt processability than polymethyl methacrylate alone or polycarbonate alone, and that the polymer blends can satisfy a wide variety of property requirements by changing their blend composition.

TABLE 7

| Comparative Example | Methyl methacrylate copolymer (parts) | L-1250 (parts) | Tg (°C.) | Light transmittance (%) | Water absorption (%) | Melt viscosity ($\times 10^{-3}$ dyn · sec/cm$^2$) |
| --- | --- | --- | --- | --- | --- | --- |
| 7 | Copolymer of Synthesis Example 1: 100 | 0 | 117 | 93 | 1.3 | 3.2 |
| 8 | 0 | 100 | 151 | 89 | 0.4 | 14.6 |
| 9 | H1000B: 100 | 0 | 101 | 93 | 2.2 | — |

EXAMPLE 13

Specimens were prepared by kneading, in the same manner as in Example 1, the copolymer of Synthesis Example 1 and L-1250 in amounts as shown in Table 8 and tested for birefringence. Table 8 also shows the results obtained.

As is apparent from the table, it is possible, in the polymer blends of the present invention, to control birefringence by changing their blend composition. That is, they can be stretched in the same stretch ratio into oriented articles having different birefringences.

Furthermore, where polycarbonate is blended in a small amount, there exists a composition ratio that gives no birefringence. This is very useful, since it shows that the polymer blends of the present invention can be formed into non-birefringence materials.

TABLE 8

| Copolymer of Synthesis Example 1 (parts) | L-1250 (parts) | Birefringence ($\times 10^4$) |
| --- | --- | --- |
| 99.0 | 1.0 | −0.5 |
| 97.8 | 2.2 | 0.0 |
| 95.0 | 5.0 | 1.1 |
| 93.0 | 7.0 | 1.8 |
| 91.0 | 9.0 | 2.7 |

As described heretofore, the polymer blends of the present invention are transparent resins with higher glass transition temperatures and lower water absorption than conventional blends of methyl methacryalte copolymer and polycarbonate, and can be blended at high temperature because of high compatibility, whereby it is possible to optionally select processing conditions.

The polymer blends of the present invention can, utilizing the above features, be used advantageously for films, plates and like shaped articles. In particular, they can be widely used for optical parts such as optical disk substrates and lenses, for which the use of polymethyl methacrylate has been limited because of problems in thermal resistance and water absorbency and that of polycarbonate because of problems in processability and birefringence.

Obviously, numerous modifications and variations of the invention are possible in light of the above teachings. It is therefore to be understood that within the scope of the appended claims, the invention may be practiced otherwise than as specifically described herein.

What is claimed is:

1. A polymer blend comprising a copolymer (A) which comprises (i) 50 to 98% by weight of units from methyl methacrylate and ii) 2 to 50% by weight of units from a monomer represented by the general formula (I), and an aromatic polycarbonate (B)

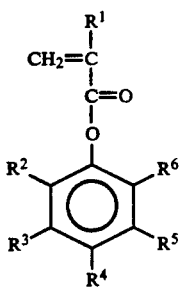

(I)

wherein $R^1$ represents a hydrogen atom or a methyl group, and $R^2$, $R^3$, $R^4$, $R^5$ and $R^6$ each represents a halogen atom or at least one of them represents a halogen atom with the rest representing a hydrogen atom, a lower alkyl group or a lower alkoxyl group.

2. A polymer blend according to claim 1, wherein said copolymer (A) comprises (i) 50 to 90% by weight of units from methyl methacrylate and (ii) 10 to 50% by weight of units from a monomer represented by the general formula (I).

3. A polymer blend according to claim 1, wherein said copolymer (A) comprises (i) 50 to 98% by weight of units from methyl methacrylate, (ii) 2 to 50% by weight of units from a monomer represented by the general formula (I) and 0 to 25% by weight of units from a copolymerizable $\alpha$, $\beta$-unsaturated monomer selected from the group consisting of styrene, α-methyl styrene, vinyl toluene, 2,4-dimethyl styrene, a halogen-substituted styrene, methylacrylate, ethylacrylate, propylacrylate, isopropyl acrylate, butylacrylate, 2-ethylhexylacrylate, laurylacrylate, cyclohexylacrylate, phenylacrylate, ethylmethacrylate, propylmethacrylate, isopropylmethacrylate, butylmethacrylate, 2-ethylhexylmethacrylate, laurylmethacrylate, cyclohexylmethacrylate, phenylmethacrylate, acrylic acid, methacrylic acid, acrylamide, methacrylamide, acrylonitrile, methacrylonitrile, maleic anhydride, maleimide, monomethylmaleate, monoethylmaleate, monoisopropyl maleate, dimethylmaleate, and diethylmaleate.

4. A polymer blend according to any one of claims 1 through 3, wherein said monomer represented by the general formula (I) is 2,4,6-tribromophenyl methacrylate.

5. A polymer blend according to claim 1 wherein said aromatic polycarbonate is derived from Bisphenol A.

6. An optical part comprising the polymer blend of claim 1.

7. In an optical disk, the improvement comprising forming the substrate of said disk with the polymer blend of claim 1.

8. A polymer blend according to claim 1 wherein said monomer represented by the general formula (I) is 2, 4, 6-tribromophenyl methacrylate and said aromatic polycarbonate is derived from Bisphenol A.

* * * * *